(12) United States Patent
Fessler et al.

(10) Patent No.: US 7,787,876 B1
(45) Date of Patent: Aug. 31, 2010

(54) METHOD AND SYSTEM FOR MOBILE CALL TESTING USING CONTACTLESS RING DETECTION

(75) Inventors: Braden J. Fessler, Lee's Summit, MO (US); Yogesh Tugnawat, Olathe, KS (US); Dave E. Reimer, DeSoto, KS (US); Gary T. Schick, Overland Park, KS (US); John H. Mondloch, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 570 days.

(21) Appl. No.: 11/517,892

(22) Filed: Sep. 8, 2006

(51) Int. Cl.
*H04W 24/00* (2009.01)
*H04B 17/00* (2006.01)
*H03C 1/62* (2006.01)
*H04R 3/02* (2006.01)

(52) U.S. Cl. .............. 455/423; 455/67.11; 455/115.1; 381/73.1

(58) Field of Classification Search ............. 455/67.11, 455/115.1, 423; 381/73.1
See application file for complete search history.

(56) References Cited

U.S. PATENT DOCUMENTS

| | | | | |
|---|---|---|---|---|
| 4,747,129 A | * | 5/1988 | Ostrowiecki | 379/199 |
| 5,442,694 A | * | 8/1995 | Chitrapu et al. | 379/373.01 |
| 5,471,649 A | * | 11/1995 | Rees et al. | 455/67.14 |
| 5,490,204 A | * | 2/1996 | Gulledge | 455/423 |
| 5,544,241 A | | 8/1996 | Dibner et al. | |
| 6,052,584 A | * | 4/2000 | Harvey et al. | 455/423 |
| 6,169,896 B1 | * | 1/2001 | Sant et al. | 455/424 |
| 6,173,074 B1 | | 1/2001 | Russo | |
| 6,478,744 B2 | | 11/2002 | Mohler | |
| 6,603,966 B1 | * | 8/2003 | Sheffield | 455/423 |
| 6,665,397 B1 | | 12/2003 | Hwang | |
| 6,690,923 B1 | | 2/2004 | Perez et al. | |
| 7,010,295 B1 | * | 3/2006 | Zerlan et al. | 455/424 |
| 7,024,161 B1 | * | 4/2006 | LaMedica, Jr. | 455/67.11 |
| 2002/0025808 A1 | | 2/2002 | Acuna | |
| 2002/0077838 A1 | * | 6/2002 | Dutta | 705/1 |
| 2002/0110228 A1 | | 8/2002 | Silverman et al. | |
| 2003/0129948 A1 | * | 7/2003 | Gab et al. | 455/67.1 |
| 2003/0231753 A1 | | 12/2003 | Casaccia | |
| 2005/0192002 A1 | * | 9/2005 | Varanda | 455/423 |

OTHER PUBLICATIONS

Viterbi, A.J.; Padovani, R., "Implications of mobile cellular CDMA," Communications Magazine, IEEE , vol. 30, No. 12, pp. 38-41, Dec. 1992 URL: http://ieeexplore.ieee.org/stamp/stamp.jsp?arnumber=210354isnumber=5459.*
Wataniya Technical Department, "TAM Complaint Investigation BAA ATOLL", Mar. 2006.
"EE 122: Final Project Writeup: Whistle-Controlled Switch", http://www.ganfamily.com/stanford/Writings/EE%20122%20-%20Analog%20Design%20Lab/ee122-fpwriteup.htm, printed from the World Wide Web on Apr. 24, 2006.

* cited by examiner

*Primary Examiner*—Nick Corsaro
*Assistant Examiner*—Larry Sternbane

(57) ABSTRACT

A method for mobile call testing is provided. The method involves initiating at a test-control module a test call to a mobile unit, and detecting at a ring-detecting module, via a contactless coupling to the mobile unit, whether the mobile unit rings in response to the test call from the test-control module. Further, the method then involves providing a ring indication from the ring-detecting module to the test-control module when a mobile ring is detected in response to the test call. In one example, the contactless coupling is an acoustic coupling.

21 Claims, 6 Drawing Sheets

METHOD AND SYSTEM FOR MOBILE CALL TESTING USING CONTACTLESS RING DETECTION

BACKGROUND

1. Field of the Invention

The present invention relates to telecommunications and, more particularly, to methods and systems for conducting mobile tests.

2. Description of Related Art

In a CDMA network for instance, when the network receives an incoming call to a mobile unit, the network uses a forward control channel, known as a paging channel, to page the mobile unit. If the mobile unit receives the page, the mobile unit may respond to the page by transmitting a response over a reverse control channel, known as an access channel. If the network successfully receives the response over the access channel from the mobile unit, the network will then generally allocate terrestrial and radio resources to the call, such as a traffic channel. Typically, when a call connection setup is successful, the mobile unit will ring to notify a mobile user of the incoming call.

To test the CDMA common control channels, such as paging and access channels, the industry adopted the "short call test", where a statistically valid number of calls are placed to a mobile unit, and the number of calls that have been set-up successfully and unsuccessfully are recorded. Typically a second reference mobile unit is tested along the side of the mobile unit under test, so as to reduce errors in mobile measurements induced by network problems, for instance.

As an example, simultaneous calls (e.g., 100 at time) may be placed to both mobiles in the same environment. If a given mobile unit rings, it is an indication that the given mobile unit has successfully acquired a traffic channel, thus passing the test of paging/access channel connection. This may generally be referred to as an "access success". If the given mobile does not ring (e.g., misses a page on the paging channel or cannot connect to the network over the access channel), an "access failure" may be declared.

To determine whether a mobile call connection set-up has been successful or not, traditional call test methods may require attaching test equipment directly to a mobile unit. The mobile unit may be directly attached to a PC controller using a data cable, and/or could be attached to other equipment (e.g., RF equipment) through other electrical (e.g., RF) connection(s). However, these type of direct electric connections can couple noise to the mobile unit and/or may generally alter operational characteristics (e.g., RF characteristics), and thus performance, of the mobile unit. For example, a direct data connection to the mobile unit may alter an antenna pattern characteristic of the mobile unit. This is undesirable, since the mobile unit may be unable to successfully transmit and/or receive wireless signals. In effect, an access failure may result.

Further, the existing test methods may often be poorly adapted to testing mobile units in a field (e.g., a test setup may only allow for testing mobile unit(s) in a lab environment), may involve manual testing methods, which could be very time-consuming for a test operator, and/or may have other limitations rendering them generally inflexible.

SUMMARY

In light of some of the noted limitations of the current mobile test solutions, the present invention provides an improved method and system for mobile call testing.

According to one embodiment of the invention, a test-control module initiates a test call to a mobile unit. In turn, a ring-detecting module detects, via a contactless coupling to the mobile unit, whether the mobile unit rings in response to the test call from the test-control module. When a mobile ring is detected in response to the test call, the ring-detecting module provides a ring indication to the test-control module.

Further, the test-control module may terminate the test call (e.g., immediately after the ring indication has been received or when no ring-indication has been received), and initiate a second test call to the mobile unit. Again, the ring-detecting module may detect, via the contactless coupling to the mobile unit, whether the mobile unit rings in response to the second test call from the test-control module. When the mobile ring is detected in response to the second test call, the ring-detecting module provides a second ring indication to the test-control module.

In a preferred embodiment, the above process is carried out automatically, and the contactless coupling is an acoustic coupling. However, in other embodiments, the contactless coupling can take other forms instead, such as an optical coupling.

Further, according to another embodiment, the above process can be extended to call testing of a plurality of mobile units (e.g., a mobile unit under test and a reference mobile unit). In this embodiment, the test-control module simultaneously initiates a respective set of test calls to a plurality of mobile units, and for each mobile unit of the plurality of mobile units, the ring-detecting module (i) detects, via a contactless coupling to the mobile unit, whether the mobile unit rings in response to the test call from the test-control module, and (ii) provides a ring indication to the test-control module when a mobile ring is detected in response to the test call.

These as well as other aspects and advantages will become apparent to those of ordinary skill in the art by reading the following detailed description, with appropriate reference to the accompanying drawings.

DETAILED DESCRIPTION

1. Overview

Figure 1A:
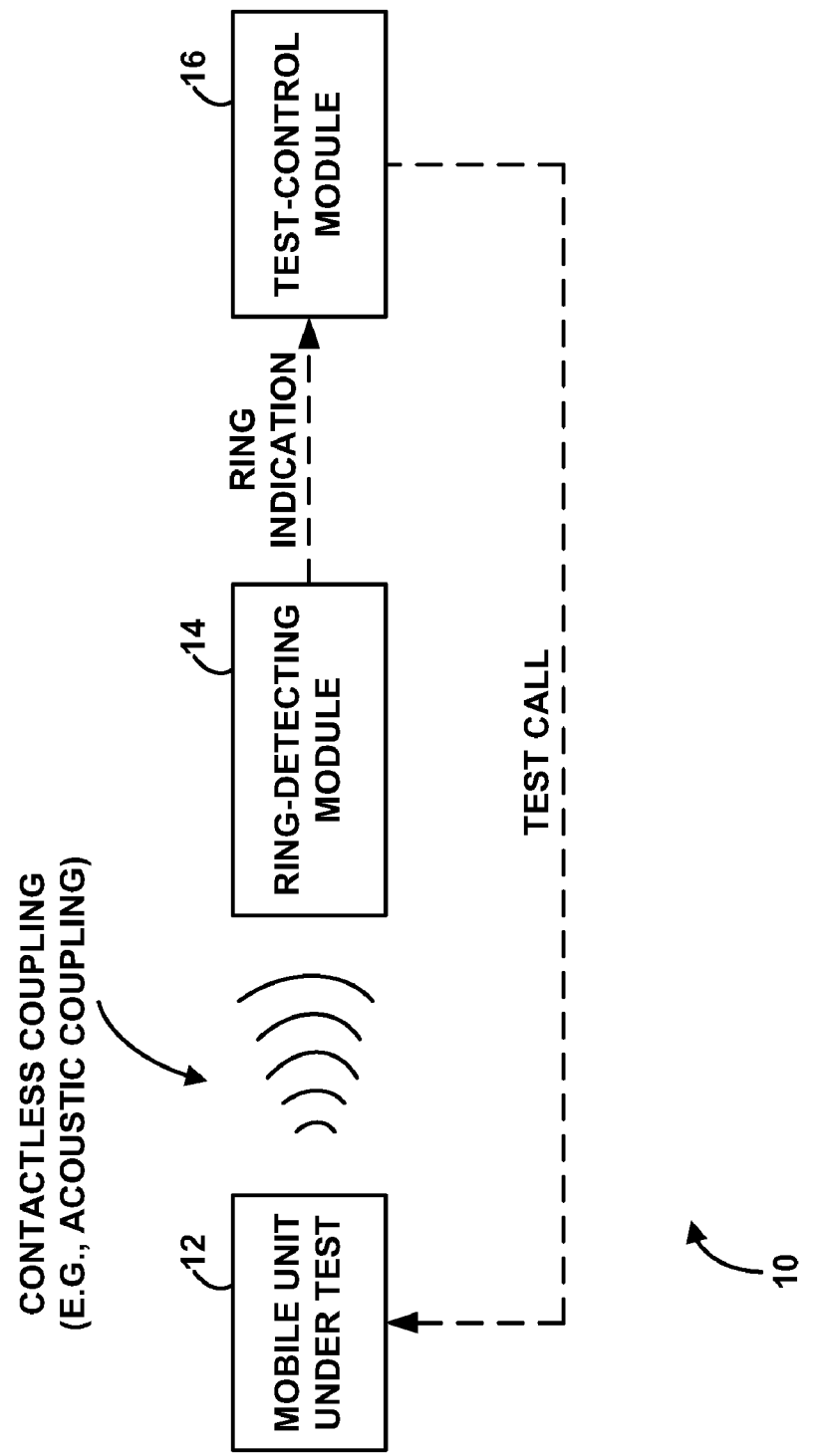
FIG. 1A is a simplified block diagram of an example test setup arranged according to a representative embodiment.

FIG. 1A is a simplified block diagram of an example test setup 10 arranged according to a representative embodiment of the invention. As shown in FIG. 1A, the test setup includes a mobile unit 12 that is a mobile unit under test, a ring-detecting module 14, and a test-control module 16.

It should be understood, however, that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will also appreciate that many of the elements described herein are functional entities that may be implemented as discrete components or in conjunction with other components, in any suitable combination and location, and various functions could be carried out by software, firmware and/or hardware.

In one example scenario, a wireless carrier may wish to perform mobile call testing to evaluate call connectivity performance. In this scenario, the wireless carrier may wish to place a number of test calls to a mobile unit, and determine, for instance, how many of those test calls result in access successes and how many of those test calls result in access failures.

In a basic operation, to test whether a call connection can be successfully set up with mobile unit 12, test-control module 16 may initiate a test call to the mobile unit. In turn, the ring-detecting module may function to detect whether the mobile unit rings in response to the test call from the test-control module. When a mobile ring is detected in response to the test call, the ring-detecting module may provide a ring indication to the test control module.

Advantageously, when the test-control module receives the ring indication, the test-control module may conclude that the test call resulted in an access success. In contrast, when the test-control module receives no ring indication (i.e., the mobile ring was not detected in response to the test call), the test-control module may conclude that the test call resulted in an access failure.

The test-control module may then terminate the test-call, and initiate a next test call to the mobile unit. In one example, the test-control module may terminate the previous test call immediately following a receipt of the ring indication associated with that test call. Otherwise, the test-control control module may wait, e.g., for a pre-determined period of time for the ring indication, and if no ring indication is received within that period, the test-control module may terminate the test call. In general, this call test process may be repeated for any given number of test calls, as configured by a test operator.

Further, as noted above, traditional methods of conducting mobile call testing may involve attaching test equipment directly to a mobile unit under test, such via a cable connection. This, however, may couple noise to the tested mobile unit and/or may generally adversely affect the operational characteristics (e.g., an antenna pattern) of the tested mobile unit, possibly resulting in erroneous test results, such as false access failures.

To address this problem, in accordance with the representative embodiment, ring-detecting module 14 is coupled to mobile unit 12 contactlessly, and the function of detecting whether mobile unit 12 rings in response to the test call from test-control module 16 occurs via a contactless coupling to the mobile unit.

As defined herein, "contactless" (or "non-contact") coupling may generally refer to the type of coupling that does not involve establishing a direct electrical contact to a mobile unit (e.g., connecting a DC or RF cable/wire to the mobile unit) in order to detect the presence of a ring on the mobile unit. Thus, in the contacless ring detection, the coupling of a mobile ring signal (energy) between the mobile unit and a ring-detecting module occurs contactlessly, i.e., without an electrical contact to the mobile unit. Advantageously, this may, for instance, reduce a possibility of undesirably altering the operational characteristics (e.g., an antenna pattern and/or other RF characteristics) of the mobile unit that could affect the validity of the test measurements.

In a preferred embodiment, the contactless coupling may take the form of an acoustic coupling, as generally shown in FIG. 1A, where ring-detecting module 14 is acoustically coupled to mobile unit 12. However, other forms of coupling that may be considered "contactless" may be also suitable. To illustrate, in another example, the contactless coupling may take the form of an optical coupling. Accordingly, a mobile ring being detected by the ring-detecting module make take various forms as well, including an acoustic signal (generally referred to as a "ringing tone" or "ring tone"), an optical signal (e.g., a flashing LED light), a vibration, and/or other type(s) of ring signal(s) that may detected "contaclessly" (e.g., an acoustic signal may detected "contactlessly" via a microphone, while an optical signal may be detected "contactlessly" via a photodector).

Figure 2:
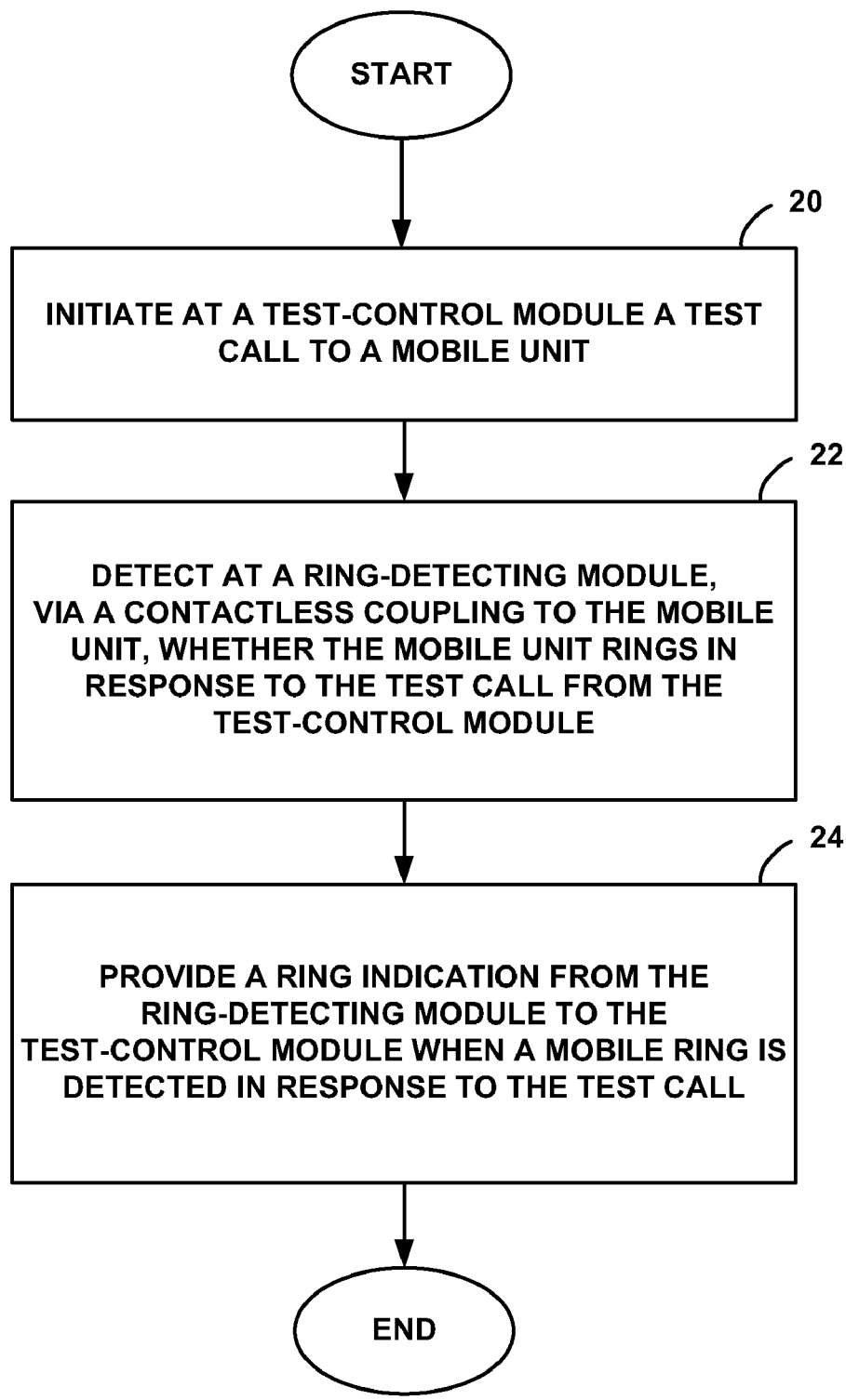
FIG. 2 is a flow chart depicting functions that may be carried out in accordance with the representative embodiment.

FIG. 2 is a flow chart summarizing a set of functions that could be carried out in accordance with the representative embodiment, in the arrangement of FIG. 1A for instance.

As depicted in FIG. 2, step 20 involves initiating at a test-control module a test call to a mobile unit. Step 22 then involves detecting at a ring-detecting module, via a contactless coupling to the mobile unit, whether the mobile unit rings in response to the test call from the test-control module. Finally, step 24 involves providing a ring indication from the ring-detecting module to the test-control module when a mobile ring is detected in response to the test call.

Figure 1B:
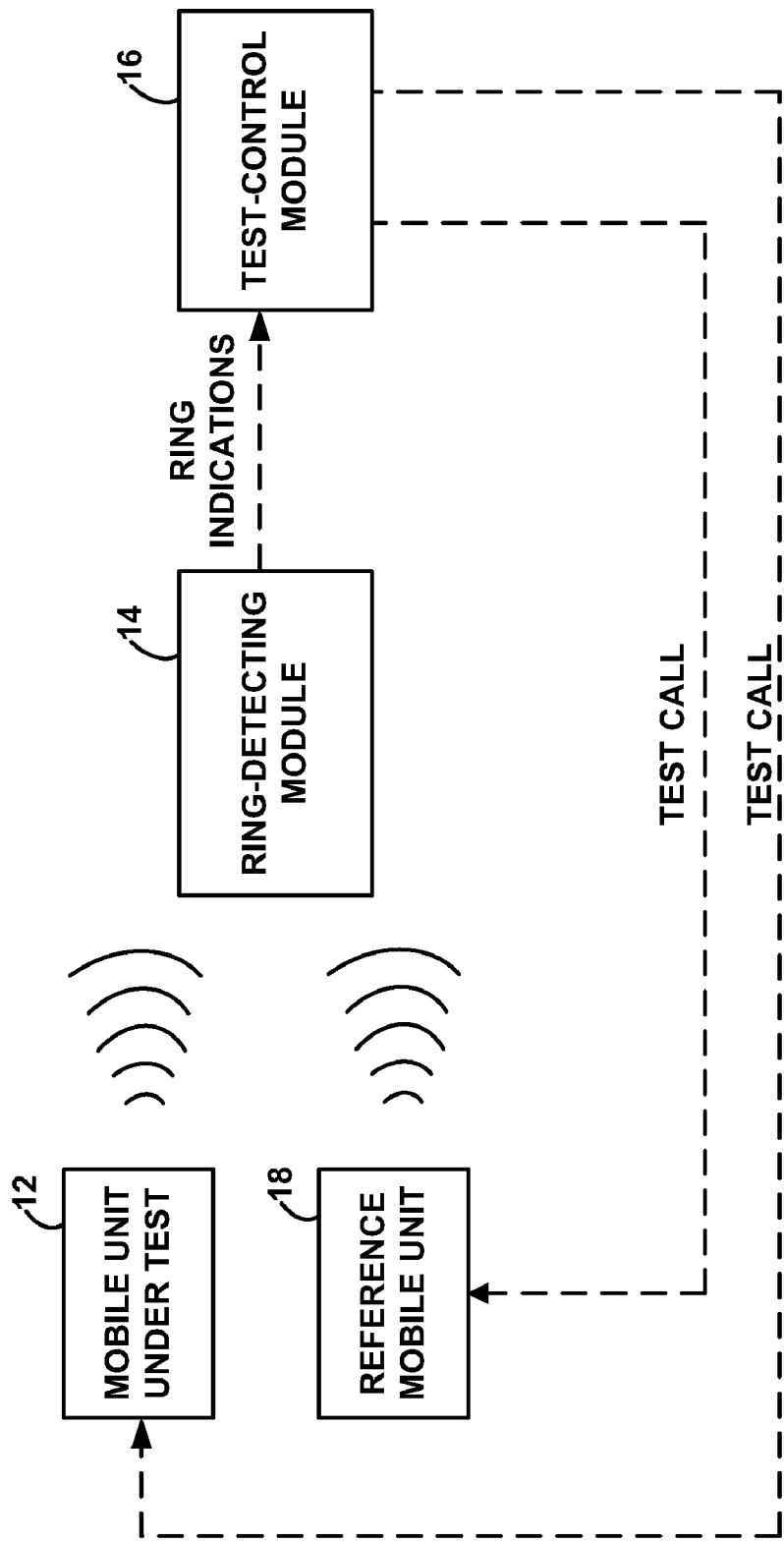
FIG. 1B is a simplified block diagram of an example test setup arranged according to another embodiment.

In addition, more than one mobile unit may be tested concurrently. FIG. 1B illustrates a test setup arranged according to another embodiment in which a mobile unit 18 is tested concurrently with mobile unit 12. Mobile unit 18 may be tested as a reference mobile unit in order to reduce test measurement errors that could be induced by variations in network performance and/or mobile performance. In the arrangement of FIG. 1B, test-control module 16 may simultaneously (e.g., at the same time or substantially at the same time) initiate respective test calls to mobile unit 12 and mobile unit 18. For each tested mobile unit, the ring-detecting module may function (i) to detect, via a contactless coupling to the mobile unit, whether the mobile unit rings in response to the test call, and further, (ii) to provide a ring indication to the test-control module when a mobile ring is detected in response to the test call. Further, similarly to the test method described with reference to FIG. 1A, the test-control module can carry out this process for a given number of consecutive test calls, by terminating one set of test calls to both mobile units and then repeating the process by re-initiating another set of test calls to the mobile units.

In the preferred embodiment, the above-described call test methods may be carried out automatically to generally facilitate mobile call testing. For example, each of the test setups shown in FIGS. 1A and 1B may be configured as an automated test control system that could automatically place a number of successive test calls to one or mobile units, and collect call statistics regarding a number of call set-up successes and failures (e.g., access successes and access failures).

2. Example Test Method and System Implementation

Figure 3:
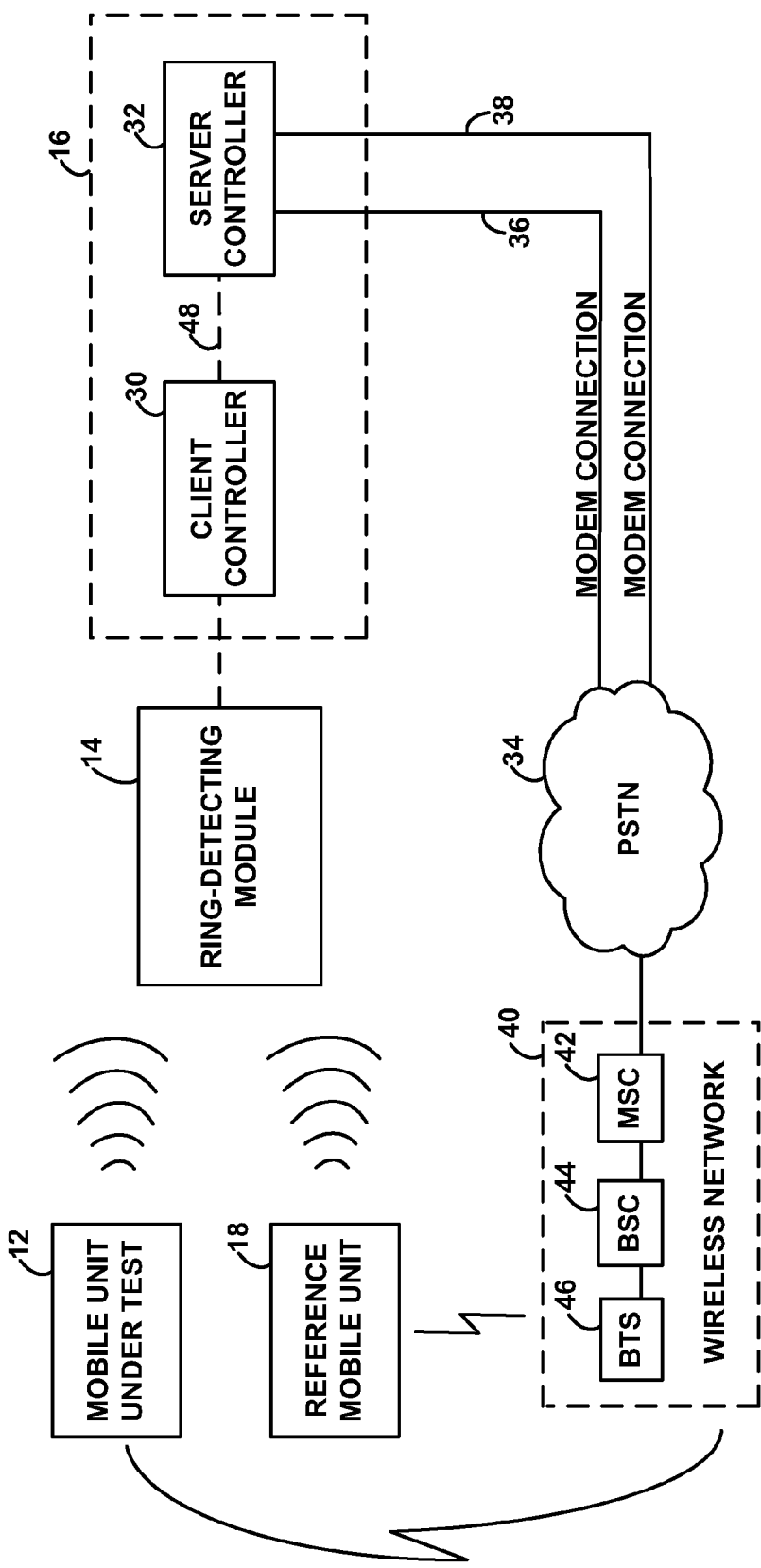
FIG. 3 illustrates the arrangement of FIG. 1B in greater detail.

FIG. 3 illustrates the test arrangement of FIG. 1B in more detail, in accordance with one illustrative embodiment. As shown in FIG. 3, test-control module 16 may comprise a client controller 30 and a server controller 32. Further, the test-control module may be connected to a landline network, such as the Public Switched Telephone Network (PSTN) 34, via two or more modem connections 36 and 38. PSTN 34 is, in turn, coupled to a wireless network 40 serving the tested mobile units 12 and 18. The serving wireless network may generally include a mobile switching center (MSC) 42, a base station controller (BSC) 44, and a base transceiver station (BTS) 46 wirelessly communicating with mobile units 12 and 18 over a suitable air interface (e.g., a CDMA interface, a GSM interface, etc.). As further shown in FIG. 3, mobile units 12 and 18 may be acoustically coupled to ring-detecting module 14.

In general, client controller 30 and server controller 32 could be implemented in software, e.g., as program logic comprising a set of machine-readable instructions executable by a processor, such as a computer processor. To illustrate, the client controller logic could be executed on one computing entity, such as a mobile computer, that could function as a field controller used in mobile drive tests to evaluate call connectivity performance at different geographic locations. In turn, the server controller logic could be executed on another computing entity, perhaps a computer located remotely from the field controller, such as in a fixed lab/office location where test results may be collected and analyzed.

In other embodiments, however, the client controller and the server controller may be carried out by separate entities that are at the same location (e.g., in a lab or in a field (such as in a vehicle used for mobile drive tests)) or may be altogether carried out by a single entity. Further, communications between client controller 30 and server controller 32 could be carried over a control link 48 that could be a direct data connection (e.g., a USB connection), a cable modem connection, a dial-up connection, a digital subscriber line (DSL) connection, a wireless (e.g., wireless broadband, cellular, 802.11, two-way radio, etc.) connection, and/or other type of connection(s).

According to the illustrative embodiment, in one instance, each of the tested mobile units 12 and 18, client controller 30 (or an entity carrying out the client controller functions) communicating (e.g., remotely) with server controller 32, and ring-detecting module 14 could be all placed/mounted inside a vehicle used for mobile drive tests, and the various call testing methods described herein could be advantageously carried out while the vehicle is moving.

To initiate and terminate test calls, server controller 32 may be arranged with two or more modem units that may be controllable through AT commands, as well known in the art. For example, the server controller module may be programmed to assert an AT-D command to initiate a tests call to a respective mobile unit over a corresponding modem connection, and to assert an AT-H command to terminate the test call. In one example, a computer executing the server controller functions could come equipped with at least one modem, while additional modem connection(s) may be provided via external modem(s).

Generally, client controller 30 may establish communication with server controller 32 to command the server controller to start and stop a mobile call test. Further, at the test initiation, the client controller module may communicate to the server controller configuration parameters to be used for the test. For example, a test operator may define via the client controller a number of test calls to be successively initiated/terminated at the server controller (e.g., 100 calls at a time at a particular location), and the client controller may responsively send a command to the server controller to configure the test accordingly.

In operation, when the server controller receives a start command from the client controller, the server controller may simultaneously initiate a set of test calls to mobile units 12 and 18 via respective modem connections 36 and 38. Each of the test calls may be delivered via PSTN 34 to MSC 42 within wireless network 40. In turn, the wireless network may attempt to establish a call connection to each respective mobile unit.

In one example, wireless network 40 may be a CDMA-based network operating according to the IS-95/IS-2000 or later standards. In the CDMA-based network, for instance, when an MSC receives an incoming call to a mobile unit (e.g., mobile unit 12 or mobile unit 18), the MSC may signal to BSC 44, such as by sending a Paging Request message to BSC 44 to inform the BSC of the pending call. The BSC may in turn transmit a page message (e.g., a General Page message as specified by the IS-95/IS-2000 CDMA standards) via BTS 46 to the mobile unit to determine whether the mobile unit is available to receive the call. The mobile unit may be tuned to a dedicated paging channel, and can receive and acknowledge the page message transmitted from the BSC by responding with a Page Response message over an assigned access channel. Upon successful receipt of the Page Response from the mobile unit, the BSC and the MSC may proceed to allocate terrestrial and radio resources to the call. For example, the BSC may assign a forward traffic channel for the call. Further, the BSC may then utilize this traffic channel to deliver a call alert message, such as an Alert with Information message, to the mobile unit to cause ringing at the mobile unit in order to alert a mobile user of the incoming call.

In the illustrative embodiment, ring-detecting module 14 may be configured to detect, via an acoustic coupling to each of mobile units 12 and 18, whether the respective mobile unit rings in response to the test call initiated at server controller 32. Further, the ring-detecting module may provide a ring indication to client controller 30 when a mobile ring is detected on the respective mobile unit in response to the test call. In turn, the client controller may send the ring-indication to server controller 32 when the ring occurs.

In one example, after the test call initiation, the server controller may wait for a predefined period of time (e.g., 30 seconds) for a response carrying ring indication(s) (and/or other signaling message indicating that a ring or no ring was detected on one or both mobile units) from the client controller before terminating both test calls. If the server controller receives the response sooner, the server controller may responsively hang up one or both modem connection(s) to terminate the test call(s) earlier such as, for example, to release valuable network resources dedicated to the test call(s). In general, the client controller may wait for ring indications from the ring-detecting module for both mobile units before responding with the test results to the server controller. In other implementations, however, the client controller can report a ring indication for a given mobile unit immediately after the ring is detected (i.e., immediately after the ring-detecting module generates the ring indication for the given mobile unit). Further, after terminating both test calls, the server controller may wait for a predefined period of time (e.g., 30 seconds) before initiating a next set of test calls to mobile units 12 and 18.

Additionally, for each set of test calls initiated by the server controller, the server controller may log the corresponding test results. After the call testing is completed (e.g., when the server controller receives a stop command from the client controller), the server controller may be programmed to automatically compile a test results report providing various call statistics, including a number of access successes (e.g., at a given location), a number of access failures (e.g., at the given location), a time-to-ring period, etc. This report may be then reviewed and analyzed by a test operator to evaluate call connectivity performance.

Figure 4:
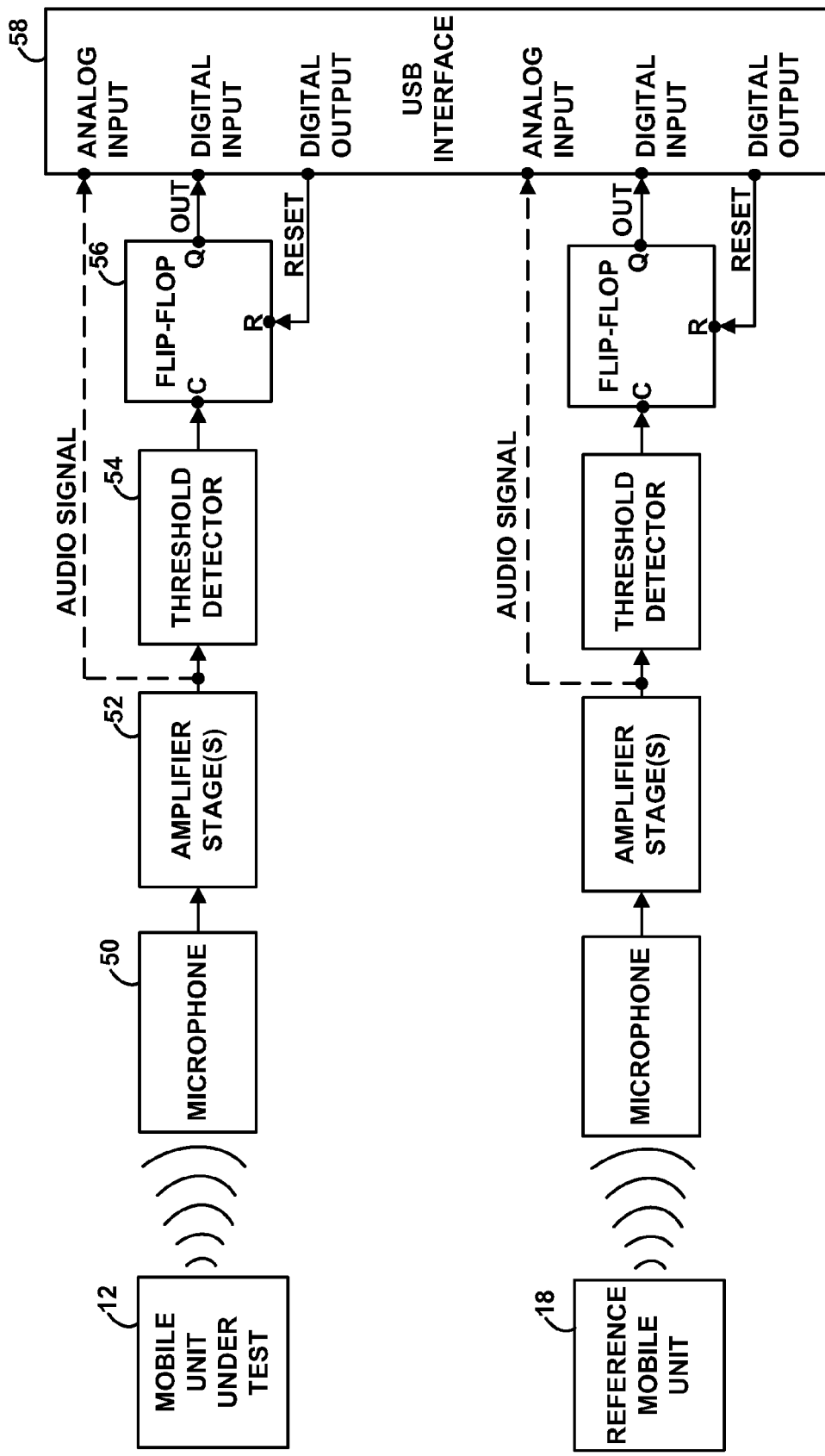
FIG. 4 illustrates one example of a ring-detecting module.

As noted above, ring-detecting module 14 is arranged to detect, via an acoustic coupling to each of mobile units 12 and 18, whether the respective mobile unit rings in response to the test call initiated at server controller 32. FIG. 4 generally illustrates one example of how ring-detecting module 14 could be implemented.

As shown in FIG. 4, each of mobile units 12 and 18 may be acoustically coupled to a corresponding microphone 50 that converts a detected acoustic signal into an electrical audio signal. Each microphone may be then coupled, through one or more amplifier stages 52 to "boost up" the audio signal to a higher level suitable for detection, to a corresponding threshold detector 54 (e.g., an op-amp comparator, such as LM139). The threshold detector output may transition from a low state (e.g., a low reference voltage) to a high state (e.g., a high reference voltage) whenever the signal amplitude of the detected signal crosses a certain threshold set in the threshold detector. In turn, the output voltage of the threshold detector may serve as a clock input to a corresponding flip-flop 56 (e.g., a D-type flip-flop). When the threshold detector output transitions to a high state in response to a mobile ring being detected, the clock transition may "set" an output state of the flip-flop (e.g., the state of a bit in the output register) accordingly. For example, the flip-flop output voltage may correspond to a logical "1" to indicate that a ring has been detected. Otherwise, the flip-flop may maintain the output state at a logical "0" to indicate that no ring has been detected.

Further, the flip-flop digital output (e.g., "0" or "1" bit) may be coupled to a digital input port on a USB interface 58 of an entity executing the client controller functions (e.g., a field controller computer). The client controller may then read the state of the digital code present on this USB port to obtain a ring indication (or lack thereof). Further, in one example, a reset input of the flip-flop may be tied to a digital USB output port, such that the client controller can toggle this output to reset the flip-flop output. For instance, when server controller 32 terminates test call(s), the server controller may signal to the client controller to reset the flip-flop output from its previous state so that another ring can be detected.

In one embodiment shown in FIG. 4, the signal detected by the microphone could be instead, or in addition, directly routed to an analog input on the USB interface for further processing to qualify the detected signal as a ring or not. In this embodiment, the entity carrying out the client controller functions could also carry out a portion of the ring-detecting module functions implemented in software. For example, the detected signal may be provided as an input to an analog-to-digital converter (A/D), which can digitize the signal, e.g., by sampling the signal at a desired rate. Further, spectral analysis may be performed on the digital signal samples to determine the spectral composition of the signal, such as by calculating the Fourier transform of the signal. (As generally known, if a signal is a sound signal, it can be represented by a combination of sinusoidal waves of different frequencies). One of the common algorithms is the Fast Fourier Transform (FFT).

In the ring-detecting arrangement of FIG. 4, it may be particularly important to provide acoustic isolation when the mobile units are operated in a noisy environment (e.g., in a noisy vehicle used vehicle during mobile drive testing), and also to isolate each mobile unit's ring from that of another unit for proper ring detection. If an acoustic ring is not isolated from ambient noise, the noise may distort a ring signal, or the microphone may altogether pick up a signal other than a ring signal, resulting in a false ring detection. Similarly, if individual mobile rings occur concurrently and are not acoustically isolated from each other, proper detection of each mobile ring may not be possible.

According to one preferred embodiment, ring-detecting module 14 may be arranged such as to acoustically isolate a plurality of concurrent mobile rings from each other, and also from external noise. For example, each of tested mobile units (e.g., each of mobile units 12 and 18) may be fastened within a closed enclosure (e.g., a plastic container with a lid) having an opening through which a mobile ringer output can be detected. One end of a plastic tube (e.g., a PVC tube) (or generally, an acoustic-coupling tube) may be attached to the opening, while a microphone may be acoustically sealed inside the tube on the other end. As a result, each mobile's ring may be then acoustically "enclosed" within the respective tube that generally shields an acoustic signal propagating inside the tube from external interference(s) (e.g., noise and/or other mobile ring signal(s)).

In another embodiment, to simplify the implementation of the ring-detecting module, commercially available sound analysis systems may be used instead to detect and differentiate between mobile rings. For example, some of these systems could be "trained" to recognize a distinctive ringing tone generated by each tested mobile unit. Other implementations may also be possible.

Figure 5:
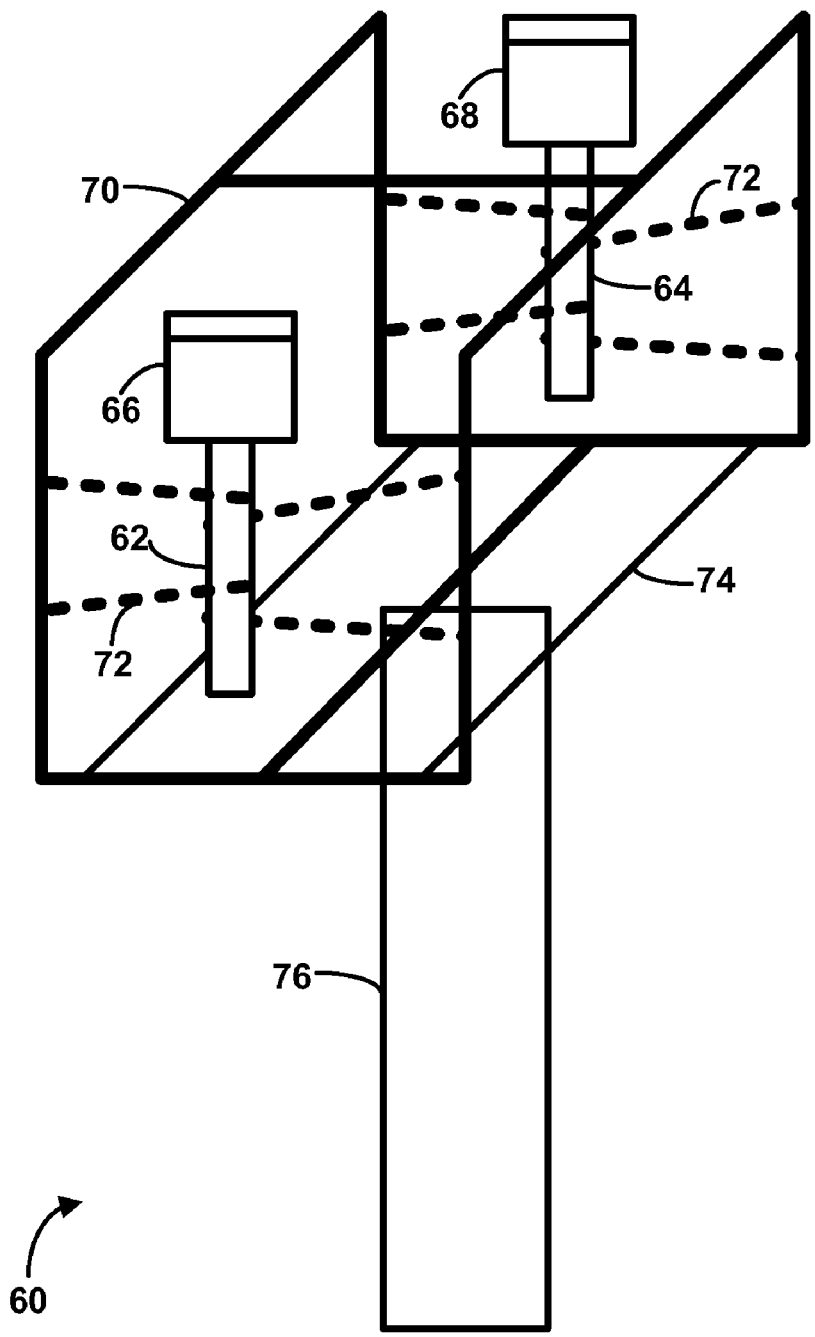
FIG. 5 illustrates an example of a holding arrangement.

FIG. 5 depicts one example of a holding arrangement 60, including acoustic-coupling tubes 62 and 64, that may be used for mobile call testing in accordance with the illustrative embodiment. The holding arrangement shown in FIG. 5 may be particularly useful in mobile drive test scenarios, such as when mobile units are tested in a moving vehicle. As shown in FIG. 5, acoustic-coupling tubes 62 and 64 may be attached (e.g., in the manner described above) to respective plastic containers 66 and 68 that may each hold a respective mobile unit being tested. For example, plastic container 66 may hold a mobile unit under test, such as mobile unit 12, and plastic container 68 may then hold a reference mobile unit, such as mobile unit 18.

Each of the mobile units may be fastened inside a respective container, and the container may be closed with a lid (as generally shown in FIG. 5) to further shield the enclosed mobile unit from outside interference(s) (e.g., noise). Further, as described above, a microphone may be acoustically sealed (e.g., by wrapping the microphone in a piece of felt and applying wax) inside each of the acoustic-coupling tubes. Although not explicitly shown, the microphone's output may be then provided, e.g., via a cable connection, to the rest of the ring-detecting module circuitry, as shown in FIG. 4 for instance.

Additionally, each of the plastic containers, along with the attached acoustic-coupling tube, may be fastened to a frame 70 by means of elastic rubber bands 72 or the like, such as to prevent vibration/rattling, particularly when testing is conducted in a moving vehicle. The frame may be constructed using plastic tubes or other suitable materials. In one example, the frame may be constructed using PVC tubes that may be connected together, e.g., using "elbow" and "T" sections as well known. Further, holding arrangement 60 may include a board 74 (e.g., made of plywood or the like) for support. Board 74 may be, in turn, mounted onto a base 76 (e.g. a plastic PVC tube) for elevation.

3. Conclusion

Exemplary embodiments of the present invention have been described above. Those skilled in the art will understand, however, that changes and modifications may be made to these embodiments without departing from the true scope and spirit of the present invention, which is defined by the claims.

The invention claimed is:

1. A mobile call test method comprising:

situating each of a plurality of mobile units in a respective container, such that each mobile unit is in a separate container;

operating a respective ring-detecting module for each container;

initiating a test-call respectively to each of the mobile units simultaneously from a test-control module;

for each mobile unit of the plurality, the ring-detecting module of the container in which the mobile unit is situated detecting, via a contactless acoustic coupling with the mobile unit, whether the mobile unit rings in response to the test-call initiated to the mobile unit from the test-control module; and for each mobile unit of the plurality, providing a ring indication to the test-control module from the ring-detecting module of the container in which the mobile unit is situated if the ring-detecting module of the container in which the mobile unit is situated detects ringing of the mobile unit, whereby situating the mobile units in the respective containers helps to acoustically isolate the mobile units during testing.

2. The method of claim 1, further comprising:
carrying out the method automatically.

3. The method of claim 1, wherein the plurality of mobile units are located inside a vehicle.

4. The method of claim 3, further comprising:
carrying out the method while the vehicle is moving.

5. The method of claim 1, further comprising:

terminating all of the initiated test-calls at the test-control module;

thereafter initiating a second test-call respectively to each of the mobile units simultaneously from the test-control module;

for each mobile unit of the plurality, the ring-detecting module of the container in which the mobile unit is situated detecting, via an acoustic coupling with the mobile unit, whether the mobile unit rings in response to the second test-call initiated to the mobile unit from the test-control module; and for each mobile unit of the plurality, providing a ring indication to the test-control module from the ring-detecting module of the container in which the mobile unit is situated if the ring-detecting module of the container in which the mobile unit is situated detects ringing of the mobile unit in response to the second test-call.

6. The method of claim 5, wherein terminating all of the initiated test-calls at the test-control module comprises terminating the initiated test-calls immediately following at least one receipt of a ring indication in response to the initiated test-calls.

7. The method of claim 1, wherein the ring-detecting module for each container comprises a microphone.

8. The method of claim 1, wherein the ring indication represents a call set-up success, and wherein an absence of the ring indication represents a call set-up failure.

9. The method of claim 1, wherein the test-control module comprises a diem controller and a server controller, wherein the client controller and the server controller are communicatively linked with each other, and wherein the server controller is at least operable to initiate the test-calls and to terminate the initiated test-calls in response to such commands from the client controller.

10. The method of claim 9, wherein the client controller comprises client controller logic and the server controller comprises server controller logic, the client controller logic being carried out by a first computing entity and the server logic being carried out by a second computing entity, and wherein the first computing entity is located remotely from the second computing entity.

11. The method of claim 1, wherein the ring indication comprises a digital code readable via the test-control module.

12. The method of claim 1, wherein each container comprises an opening through which the ringing of the mobile unit situated in the container can be detected by the ring-detecting module operated for the container, and wherein detecting whether the mobile unit rings comprises detecting via the opening whether the mobile unit rings.

13. The method of claim 12, wherein an acoustic coupling tube is attached to the opening, and wherein the ring-detecting module is acoustically sealed inside the tube, and wherein detecting whether the mobile unit rings comprises detecting via the acoustic tube whether the mobile unit rings.

14. A mobile call test system, comprising:

a plurality of containers each for holding a mobile unit under test, wherein each of the mobile units is situated in a respective container such that each mobile unit is in a separate container, whereby situating the mobile units in the respective containers helps to acoustically isolate the mobile units during testing;

a test-control module operable to initiate a test-call respectively to each of the mobile units simultaneously;

a contactless acoustic coupling respectively for each mobile unit; and a respective ring-detecting module for each container, wherein the ring-detecting module of the container in which each mobile unit is situated is operable (i) to detect, via the respective contactless acoustic coupling for the mobile unit, whether the mobile unit rings in response to the test-call initiated to the mobile unit from the test-control module, and (ii) to provide a ring indication to the test-control module if the ring-detecting module of the container in which the mobile unit is situated detects ringing of the mobile unit.

15. The system of claim 14, wherein the ring-detecting module for each container comprises a microphone.

16. The system of claim 14, wherein the test-control module comprises a client controller and a server controller, wherein the client controller and the server controller are communicatively linked with each other, and wherein the server controller is at least operable to initiate the test-calls and to terminate the initiated test-calls in response to such commands from the client controller.

17. The system of claim 16, wherein the server controller is further operable to receive test-configuration parameters from the client controller.

18. The system of claim 16 wherein the client controller comprises client controller logic and the server controller comprises server controller logic, the client controller logic being carried out by a first computing entity and the server logic being carried out by a second computing entity, and wherein the first computing entity is located remotely from the second computing entity.

19. The system of claim 14, wherein the ring indication is a digital code readable via the test-control module.

20. The system of claim 14, wherein each container comprises an opening through which the ringing of the mobile unit situated in the container can be detected by the ring-detecting module operated for the container.

21. The system of claim 20, wherein an acoustic coupling tube is attached to the opening, and wherein the ring-detecting module is acoustically sealed inside the tube.

* * * * *